(No Model.) 2 Sheets—Sheet 1.

V. DI MARZO.
SELF REGULATING LAMP.

No. 268,114. Patented Nov. 28, 1882.

Attest:
Walter Fowler
H. B. Applewhaite

Inventor:
V. Di Marzo
per attys.
A. H. Evans & Co.

(No Model.) 2 Sheets—Sheet 2.

V. DI MARZO.
SELF REGULATING LAMP.

No. 268,114. Patented Nov. 28, 1882.

Attest:
Walter Fowler
H. B. Applewhaite

Inventor:
V. Di Marzo
per attys.
A. H. Evans & Co

United States Patent Office.

VINCENT DI MARZO, OF BENICIA, CALIFORNIA.

SELF-REGULATING LAMP.

SPECIFICATION forming part of Letters Patent No. 268,114, dated November 28, 1882.

Application filed September 18, 1882. (No model.)

*To all whom it may concern:*

Be it known that I, VINCENT DI MARZO, of Benicia, county of Solano, State of California, have invented an Improved Self-Regulating Lamp; and I hereby declare the following to be a full, clear, and exact description thereof.

My invention relates to a self-regulating lamp; and it consists in the details of construction of a lamp having an elevated oil-reservoir and a receiving-chamber into which the oil flows through a passage the valve of which is opened or closed by levers connected with a float rising and falling with the oil supply. The movements of this float also actuate a wick-ratchet, so that the wick may be constantly renewed. In connection with the apparatus is a cut-off valve, also actuated by a float, so that in case of a failure of the supply-valve to act this last one will be moved by the overflow and will entirely cut off the supply.

Figure 1:
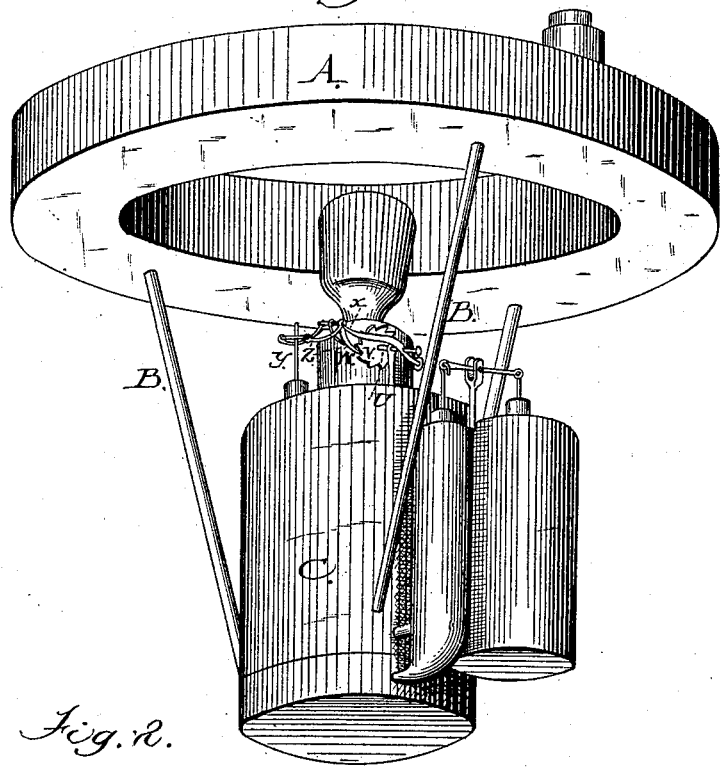
Figure 2:
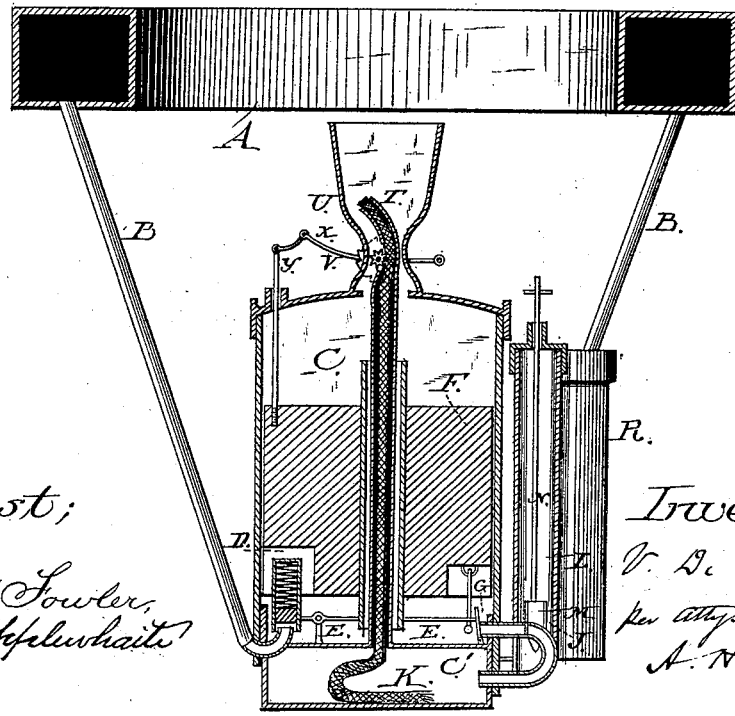
Figure 3:
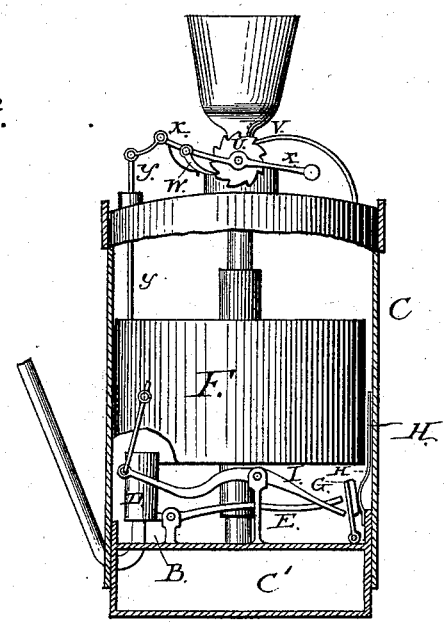
Figure 4:
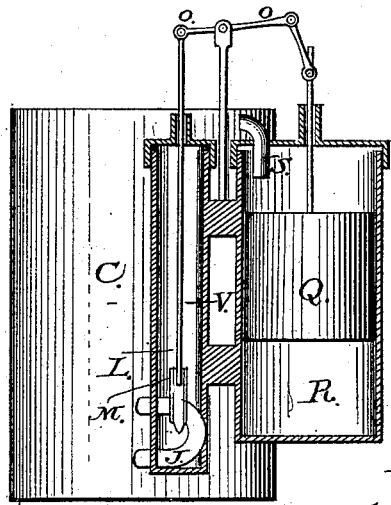

Referring to the accompanying drawings for a more complete explanation of my invention, Figure 1, Sheet 1, is a perspective view of the apparatus. Fig. 2, Sheet 1, is a vertical section. Fig. 3, Sheet 2, is a vertical section of the lamp, showing supply-valve and float and wick-moving device. Fig. 4, Sheet 2, is a section of cut-off valve and float.

A is the oil-reservoir, which in the present case is shown as a large annular chamber, suitably supported or suspended, as may be desired. Arms B extend downward from this reservoir, and between them the oil-receiver C with the lamp and contained mechanism are supported. One of these arms B is tubular and has one end open into the reservoir A, while the other opens into the side of the receiver C, being turned up so that the valve or stopper D may fit over its end. This valve consists of a hollow case having a cork or other suitable valve-seat within it near the bottom, and a spiral spring in the upper part which presses upon the valve, and thus makes it fit closely and at the same time allows the valve to adjust itself to varying pressures upon it. A lever-arm, E, has one end connected with this valve, and the opposite end is connected with a float, F, so that as the oil rises within the receiver C the float also rises and through the lever E closes the valve. When the outer end of this lever has been raised so as to close the valve a hinged stop-plate, G, is pressed beneath its end by a spring, H, and thus holds it up and keeps the valve closed until the consumption of the oil allows the float to sink down to a point where it is necessary to again open the valve. This is done by the action of a second lever, I, which has one end connected with the float, while the other extends across the chamber to the stop-plate G, and when the float has settled to the proper point this lever will press the plate G back and allow the valve D to open again and a fresh supply of oil to flow in. The oil passes from the chamber C through a pipe, J, down into a lower compartment, C', from which it is carried up to the burner by means of a wick, K. The pipe J curves outward from the receiver, so as to pass through the bottom of a chamber, L, returning thence into the chamber C', as shown.

Within the chamber L a cut-off valve, M, is fitted to the pipe J, and a rod, N, extends up through the top of the chamber and is connected with one end of a lever-arm, O. The opposite end of this lever is connected with the stem P of a float, Q, which is placed within a chamber, R. This latter chamber is connected by a pipe, S, with the space around the wick-tube and upon the top of the receiver C, and if from any reason the valve D should cease to act and an overflow of oil consequently take place it would escape into the chamber R, would raise the float Q, and through the lever and connections would close the valve M, and thus cut off any further supply to the chamber C'.

The wick-tube T extends upward to form a burner at the top of the chamber C, and is but a little to one side at the top, as shown, so that as the wick becomes charred it will drop off and leave the end clear. The wick is turned up by a toothed shaft, U, having the usual disk at the outer end by which to turn it when desired. In addition to this a ratchet-wheel, V, is also fixed to the shaft, and a pawl, W, is so mounted that it will engage the ratchet and turn it in one direction when moved. This pawl is attached to a light frame, X, one end of which is connected with a stem, Y. This stem extends down through the top of the chamber, being suitably packed, and is connected at the lower end with the float F, so that it and the frame X and pawl W are moved up and down by the movements of the float. When the float sinks it draws the stem Y, frame X, and pawl W down, and thus turns the ratchet V and shaft U so as to raise the wick. A spring-pawl, Z, prevents the ratchet from turning backward. This may be moved to one side when it is desired to turn the device by hand.

By this combination of mechanism the lamp is rendered automatic, and will burn and take care of itself as long as there is any oil in the reservoir.

It will be manifest that the wick-tube might be carried up on the outside of the reservoir and stop at a height just above the level of the oil, which will insure a more perfect combustion.

Having thus described my invention, what I claim as new, and desire to secure by Letters Patent, is—

1. The receiver C, with its supply-pipe B, valve D, lever E, and float F, in combination with the hinged locking-plate G and spring H, substantially as herein described.

2. The receiver C, supply-pipe B, valve D, lever E, float F, and locking-plate G, in combination with the detaching-lever I, having one end connected with the float and the other acting to force the plate G outward, substantially as herein described.

3. The chambers C and C', with the curved connecting-pipe J, passing through the chamber L, and having the cut-off valve M, in combination with the chamber R, float Q, lever O, and connecting-rods N and P, and the pipe S, leading from the tops of the receiver C to the chamber R, substantially as herein described.

4. The wick-tube with its toothed shaft U, in combination with the ratchet V, pawl W, oscillating frame X, and stem Y, connecting with the float F, substantially as herein described.

5. In a lamp, the receiver C C', connected with and suspended from the reservoir A by the pipe or pipes B, the valve D, float F, and connecting-lever E, in combination with the chambers L R, float Q, pipe J, valve M, and actuating-lever O, substantially as herein described.

In witness whereof I hereunto set my hand.

VINCENT DI MARZO.

Witnesses:
M. JAMES FAHY,
PETER E. RILEY.